(12) United States Patent
Piggott

(10) Patent No.: US 11,789,124 B2
(45) Date of Patent: Oct. 17, 2023

(54) RANGING USING A SHARED PATH OPTICAL COUPLER

(71) Applicant: Pointcloud Inc., San Francisco, CA (US)

(72) Inventor: Alexander Yukio Piggott, San Mateo, CA (US)

(73) Assignee: Pointcloud Inc., Zurich (CH)

( * ) Notice: Subject to any disclaimer, the term of this patent is extended or adjusted under 35 U.S.C. 154(b) by 0 days.

(21) Appl. No.: 18/122,397

(22) Filed: Mar. 16, 2023

(65) Prior Publication Data

US 2023/0221421 A1 Jul. 13, 2023

Related U.S. Application Data

(63) Continuation of application No. 16/784,849, filed on Feb. 7, 2020, now Pat. No. 11,619,710.

(60) Provisional application No. 62/802,590, filed on Feb. 7, 2019.

(51) Int. Cl.
| | |
|---|---|
| *G01B 11/22* | (2006.01) |
| *G01S 7/491* | (2020.01) |
| *G01S 7/4911* | (2020.01) |
| *G01S 7/481* | (2006.01) |
| *G01S 17/894* | (2020.01) |
| *G01S 17/08* | (2006.01) |

(52) U.S. Cl.
CPC .......... *G01S 7/4911* (2013.01); *G01B 11/22* (2013.01); *G01S 7/4811* (2013.01); *G01S 7/4814* (2013.01); *G01S 7/4816* (2013.01); *G01S 17/08* (2013.01); *G01S 17/894* (2020.01)

(58) Field of Classification Search
CPC ...... G01S 17/894; G01S 7/4813; G01S 17/08; G01S 7/4811
See application file for complete search history.

(56) References Cited

U.S. PATENT DOCUMENTS

| | | | |
|---|---|---|---|
| 6,847,437 B2 * | 1/2005 | Bruel | G01P 5/26 356/28.5 |
| 7,095,925 B2 * | 8/2006 | Grunnet-Jepson | G01D 5/35396 385/10 |
| 9,476,981 B2 | 10/2016 | Yaacobi et al. | |
| 11,125,881 B2 * | 9/2021 | Chen | G01S 17/931 |

(Continued)

FOREIGN PATENT DOCUMENTS

| | | | |
|---|---|---|---|
| WO | WO-2019063464 A1 | 4/2019 | |
| WO | WO-2020163717 A1 | 8/2020 | |

OTHER PUBLICATIONS

"U.S. Appl. No. 16/784,849, Non Final Office Action dated Sep. 2, 2022", 13 pgs.

(Continued)

*Primary Examiner* — Tsion B Owens
(74) *Attorney, Agent, or Firm* — Schwegman, Lundberg & Woessner, P.A.

(57) ABSTRACT

Described are various configurations for transmitting and receiving optical light using a shared path ranging system. The shared path ranging system can include an optical router (e.g., an optical coupler) coupled to a grating to transmit light to a physical object and receive light reflected by the physical object. The shared path ranging system can include rows of routers and gratings in a two-dimensional configuration to transmit and receive light for ranging purposes.

20 Claims, 15 Drawing Sheets

(56) References Cited

U.S. PATENT DOCUMENTS

| | | | |
|---|---|---|---|
| 2006/0210214 | A1 | 9/2006 | Uhlhom et al. |
| 2017/0168142 | A1* | 6/2017 | Kumagai et al. |
| 2018/0372875 | A1* | 12/2018 | Juelsgaard ............ G01S 7/4815 |
| 2019/0064356 | A1* | 2/2019 | Yoon ....................... G01S 17/10 |
| 2020/0025926 | A1 | 1/2020 | Asghari et al. |
| 2020/0256958 | A1 | 8/2020 | Piggott |

OTHER PUBLICATIONS

"U.S. Appl. No. 16/784,849, Notice of Allowance dated Feb. 22, 2023", 8 pgs.

"U.S. Appl. No. 16/784,849, Response filed Nov. 30, 2022 to Non Final Office Action dated Sep. 2, 2022", 10 pgs.

"International Application Serial No. PCT/US2020/017214, International Preliminary Report on Patentability dated Aug. 19, 2021", 9 pgs.

"International Application Serial No. PCT/US2020/017214, International Search Report dated Apr. 23, 2020", 2 pgs.

"International Application Serial No. PCT/US2020/017214, Written Opinion dated Apr. 23, 2020", 7 pgs.

* cited by examiner

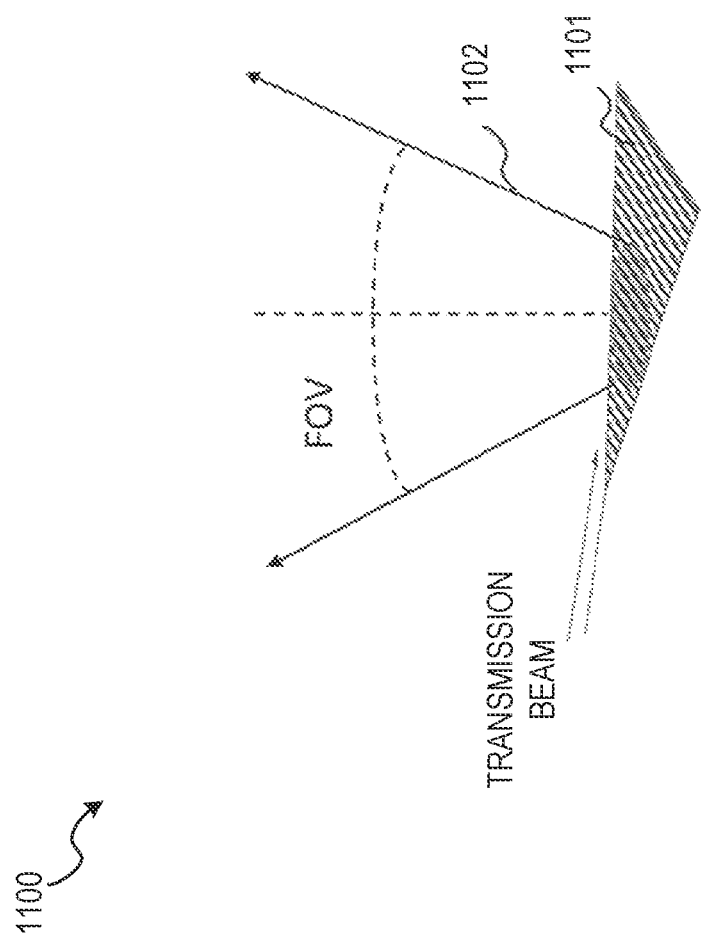

RANGING USING A SHARED PATH OPTICAL COUPLER

PRIORITY

This application is continuation of U.S. patent application Ser. No. 16/784,849, filed Feb. 7, 2020, which claims priority to U.S. Provisional Application Ser. No. 62/802,590, filed Feb. 7, 2019, which is incorporated by reference herein in its entirety.

TECHNICAL FIELD

The present disclosure generally relates to photonic integrated circuits for transmitting and receiving light.

BACKGROUND

Optical ranging systems can bounce light off an object and ascertain the object's distance by comparing the transmitted and reflected light. Conventional optical ranging systems are large unwieldly systems that require many parts. Such systems can be difficult to integrate into real world applications, such as autonomous vehicle object detection systems.

BRIEF DESCRIPTION OF THE DRAWINGS

To easily identify the discussion of any particular element or act, the most significant digit or digits in a reference number refer to the figure ("FIG.") number in which that element or act is first introduced.

FIGS. 11A and 11B illustrate a symmetric normal emitting grating with a wide field of view for transmitting and receiving, according to some example embodiments.

DETAILED DESCRIPTION

Figure 1:
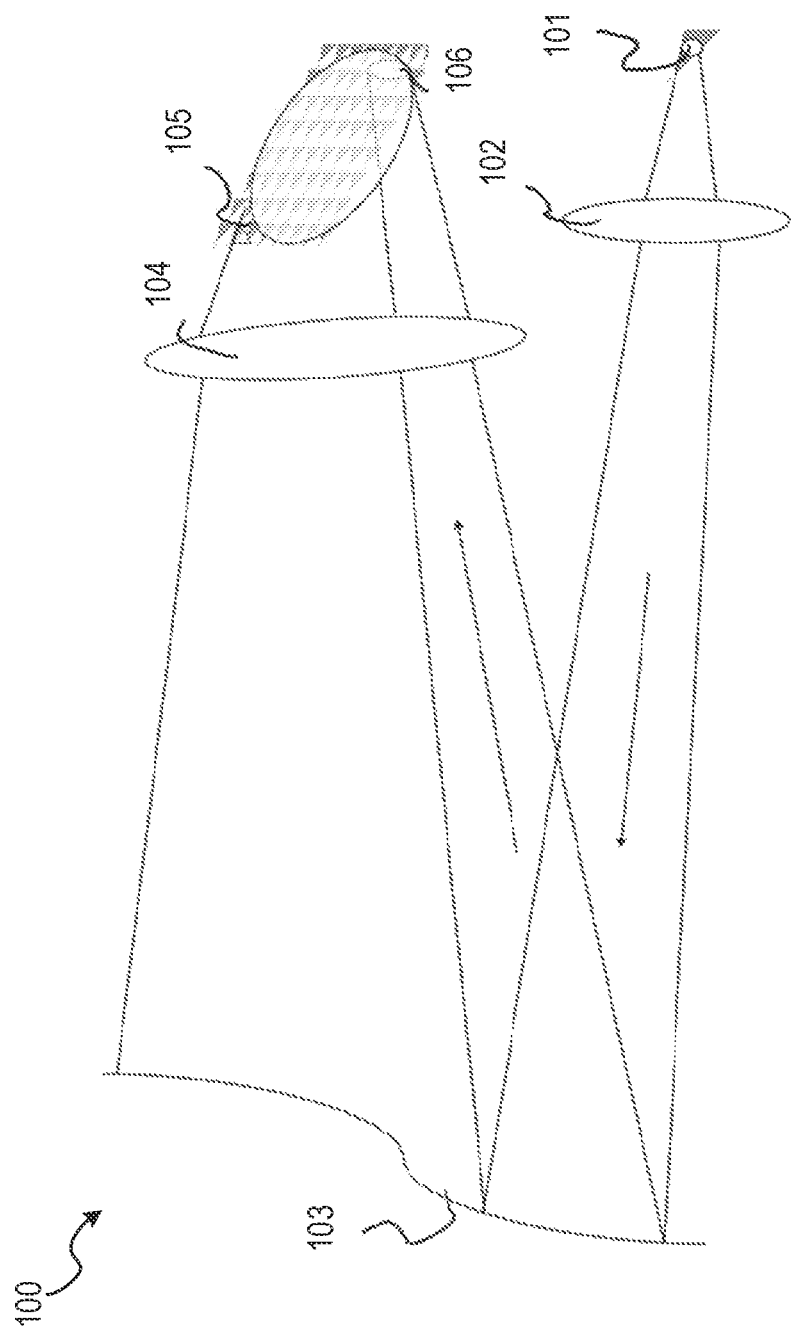
FIG. 1 illustrates a ranging configuration, according to some example embodiments.

The description that follows includes systems, methods, techniques, and instruction sequences that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Some example embodiments involve the field of light detection and ranging (LIDAR) three-dimensional (3D) imaging and more specifically involve the creation of accurate 3D maps of environments and objects as needed for autonomous navigation, as well as mapping of objects as needed for object recognition applications, such as surveillance and robotic manipulation.

In some example embodiments, two approaches for measuring the coordinates of a remote target and creating a 3D image of an object or environment include: (1) a based on time of flight (ToF Lidar) approach in which measurements of a short pulse or pulse succession emitted by a laser are converted to a 3D map by comparing the rising edge of the transmitted pulse and the rising edge of the reflected pulse to determine an amount of time the light is in flight, and (2) a continuous wave laser transmitter approach in which phase is modulated (e.g., as in Amplitude Modulation Continuous Wave (AMCW) Lidar) or frequency is modulated (e.g., as in Frequency Modulation Continuous Wave (FMCW) Lidar), and the phase or frequency shift in the target scattered signal with respect to the original signal can be measured to determine distance.

Some implementations implement the time of flight approach with amplitude modulation due to the abundance of nanosecond-pulse-length high-peak-power laser sources necessary to provide the desired range and accuracy. Some examples of conventional approaches include: a rotating head with mechanically fixed laser/detector pairs all rotating with the head assembly, approaches in which the scanning of the beam can be accomplished using a micro-electrical-mechanical system (MEMS) mirror, a galvo-mirror, rotating prisms or other opto-mechanical scanning solutions coupled with the use of one or multiple high-speed high gain avalanche photodetectors. One disadvantage of these approaches is the large number of discrete parts required, which leads to a high cost of manufacturing.

One further approach includes a detector array with single photon detection sensitivity, such as the Princeton Lightwave LIDAR cameras. One disadvantage of such a system is the high cost and difficulty in manufacturing specialized InGaAs high speed, high sensitivity detector arrays required for such an approach.

One further approach includes a time gated silicon-based detector array, such as Texas Instruments and STMicroelectronics sensors. Disadvantages for these types of sensors is that they are limited to very short distances—generally up to 3 meters, furthermore the resolution is typically low (e.g., in the range of several centimeters), and are strongly affected by ambient light.

One further approach includes a coherent nanophotonic imager that implements chirped frequency amplitude modulation. However, the coherent nanophotonic approach uses a difficult to implement phase control mechanism for a small number of pixels used for a short-range configuration. Accurate phase control is necessary in this implementation and it is difficult to maintain in a non-laboratory setting. In addition, scaling such a system has not been demonstrated.

One aspect of 3D imaging systems that enables longer-range high-resolution systems can include the ability to control the shape of the outgoing optical beam. For a short-range system using a focal plane array on the receiver side one can use a wide-angle illumination of the entire scene to be captured. As the desired range increases, in order to receive enough scattered photons on each pixel of the focal plane array, the need to reduce the divergence of the outgoing beam and therefore increase the intensity on the surface of the target arises. In order to reconcile the need to have a wide field of view of the system and the low divergence necessary to achieve a desired range, the ability to dynamically shape and scan the optical beam over the surface of the target landscape may be necessary. Several approaches for handling this issue include (a) a two-dimensional scanning mirror which scans a low divergence (or collimated) beam over the landscape, the mirrors being either macroscopic driven by piezo drives or Micro Electro Mechanical Systems, (b) an optical phased array of micro antennas where the shaping and direction of the optical signal can be controlled by adjusting the phase or wavelength of the outbound signals in each of the antennas in the array (e.g., thereby shaping the far field shape and beam direction). Mirror based approaches suffer from speed and reliability problems while optical phased arrays have proven technologically very difficult to implement for optical domain electromagnetic waves.

Finally, receiver focal plane arrays can be combined with a steering mechanism of a collimated beam in the transmitter to be used for scanning the target area using far field interference, which allows for both the advantages of focal plane arrays as well as the high intensity on the target necessary to achieve long range. In order to achieve larger number of points per second, reduce steering requirements, simultaneous illumination of several pixels and readout in parallel is desirable. In some example embodiments in which focal plane arrays are combined with steering, the transmit and receive paths are not shared. If maximum range is to be achieved, the transmitter beams should be kept as collimated as possible in order to maintain maximum intensity of illumination on the target. If the target area to be imaged is larger than the product between the diffraction limited beam size on the target and the number of positions per frame for the steering mechanism, simultaneous multiple pixel illumination leads to lower efficiencies as photons are wasted to illuminate areas on the target that are imaged in the spaces between the active areas of the pixels where readout and amplification circuitry lies.

To this end, a ranging architecture that improves the efficiency of separate path focal plane arrays can be implemented by using a shared path pixel architecture replicated in a two-dimensional array, according to some example embodiments. In a shared receiver/transmitter path configuration the single path architecture illuminates only those parts of the target which correspond to the field of view of the individual pixel. As only the spots on the target to be imaged that correspond to the active area of the pixels are illuminated by the transmitter beam, high intensity in the transmitter beam can be maintained, no light is wasted, and the overall efficiency of the system is improved.

In some example embodiments, an optical signal generation module produces laser light with defined spectral and power characteristics. The light can be transmitted via optical fiber or through free space to an optical signal processing module, which can include a photonic integrated circuit (PIC) that performs a plurality of passive and active optical functions to create one or multiple signals with tailored amplitude, phase and spectral characteristics. The plurality of optical signals processed by the optical signal processing module are sent to one or a plurality of beam directional switches. The directional switches direct in the plane of the chip the plurality of optical beams towards a subset of on-chip optical couplers. The on-chip optical couplers direct the optical signal out of the plane of the optical chip and towards the target. The plurality of directional switches select the optical coupler or the plurality of optical couplers that will receive light and couple it out of the plane of the chip and towards the target. Once exiting the plane of the chip, the optical signal or the plurality of the optical signals are collimated via a lens and directed towards the target. In an aspect, the array of optical couplers are positioned in the focal plane of a lens and by selecting the out-of-chip optical coupler or plurality of out-of-chip optical couplers with the help of the optical switch, the optical signal or plurality of optical signals are directed at different angles with respect to the normal to the plane of the chip, therefore providing a beam steering function.

The return optical signal can be detected by a receiver PIC including an array of sensors and using a coherent detection technique. The optical signal converted into an electrical signal by the array of sensors can be processed by the electronic signal processing unit and information about the location and speed of the targets can be quantified. In an aspect, the optical signal used can be within the 1530 nm to 1565 nm range to take advantage of higher maximum permissible exposure limits, and low background optical noise. In an aspect, the transmitter and receiver PICs are implemented using a silicon photonics platform.

In some example embodiments, after reflecting off the target, the return optical signal or plurality of optical signals are collected by a lens and focused back into the same on chip optical coupler or plurality of optical couplers which were used to couple out of the chip the outbound optical signal or plurality of optical signals, effectively achieving full overlap between the outbound and inbound optical signals, as discussed in further detail with reference to FIG. 2 below.

In some example embodiments, the single path ranging system includes a semiconductor photonic circuit for providing a frequency chirped light beam. The semiconductor photonic circuit can include a continuous wave light source coupler, e.g., for providing a light beam from a light source. The semiconductor photonic circuit can also include a coupling element that can be configured to receive the light beam from the continuous wave light source coupler and divide the light beam into a first portion and a second portion.

The semiconductor photonic circuit can also include a first modulator that can be configured to receive, and provide in-phase modulation of, the first portion of the divided light beam. The semiconductor photonic circuit can also include a second modulator in parallel with the first modulator, the second modulator can be configured to receive, and provide quadrature modulation of, the second portion of the divided light beam. The semiconductor photonic circuit can also include a phase control element that can be configured to adjust the relative phase between the first and second portion of the divided light beam. The semiconductor photonic circuit can also include an outcoupler that can be configured to receive and combine the outputs of the first modulator and second modulator to form a frequency chirped light beam.

The semiconductor photonic circuit can also include a demultiplexer that can be configured to receive a light beam and provide the light beam to N different coupling elements. The demultiplexer can include a multi-mode interference waveguide, a plurality of multimode interference waveguides arranged in a tree configuration or a star coupler. The semiconductor photonic circuit can also include a semiconductor amplifier or plurality of parallel semiconductor amplifiers integrated with the semiconductor photonic circuit. The light beam can have a power of less than an onset power for non-linear effects corresponding to a waveguide cross section. The light beam can have a power of less than approximately 50 mW. The photonic circuit can include silicon. The first modulator and the second modulator can include a PN or PIN junction. The semiconductor photonic circuit can also include a tap coupler and photodiode that can be configured to provide a feedback signal that can be used to adjust the bias phase shifter. The first modulator and the second modulator can include a thermo-optic modulator, an injection electro optic modulator, or a depletion electro optic modulator. A wavelength of the light beam can be in a range from about 1300 nm to 1600 nm. The semiconductor photonic circuit can include a compound semiconductor.

In some example embodiments, single path ranging system can include a method for providing a frequency chirped light beam. The method can include using a continuous wave light source, such as to provide a light beam. The method can also include coupling the light beam to a planar waveguide and dividing the light beam into a first portion and a second portion. The method can also include modulating the first portion of the divided light beam in-phase. The method can also include modulating the second portion of the divided light beam in-quadrature. The method can also include combining the modulated first portion of the divided light beam and the modulated second portion of the divided light beam to form a frequency chirped light beam. The method can also include providing a phase shift of the combined light beam, such as to adjust a phase of the frequency chirped light beam. The method can also include a de multiplexer to provide a plurality of frequency chirped optical signals. The method can also include a semiconductor optical amplifier or plurality of semiconductor optical amplifiers to increase the power of the optical signal after the modulation step. The method can also include reducing a power of the light beam to less than a power level corresponding to the waveguide cross section at which an onset of nonlinear effects occurs. The method can also include reducing a power of the light beam to less than approximately 50 mw, such as to reduce non-linear losses. The method can also include generating multiple frequency chirps in the frequency chirped light beam simultaneously or sequentially.

In some example embodiments, the single path ranging system includes a semiconductor photonic circuit for providing a frequency chirped light beam. The semiconductor photonic circuit can include a continuous wave light source coupler for providing a light beam from a light source. The semiconductor photonic circuit can also include a plurality of coupling elements, where each individual coupling element can be configured to receive the light beam from the continuous wave light source and divide the light beam into a first portion and a second portion. The semiconductor photonic circuit can also include a plurality of first modulators, wherein an individual one of the plurality of first modulators can be configured to receive, and provide in-phase modulation of, a corresponding first portion of the divided light beam. The semiconductor photonic circuit can also include a plurality of second modulators, wherein an individual one of the plurality of second modulators can be configured to receive, and provide quadrature modulation of, a corresponding second portion of the divided light beam. The semiconductor photonic circuit can also include a plurality of phase shifters, wherein an individual one of the plurality of phase shifters can be configured to adjust the relative phase of the in-phase vs the quadrature modulated optical signals prior to recombination.

In some example embodiments, the single path ranging system includes a semiconductor photonic circuit containing a tunable semiconductor laser to directly provide the frequency chirped optical signal. In an aspect the disclosure can feature a semiconductor photonic circuit receiving the frequency chirped optical signal and sending it towards the target using a pair of out of plane of the chip optical couplers or a plurality of pairs of out of plane of the chip optical couplers. The semiconductor photonic circuit can also include a first coupling element which can be configured to receive light or a portion of the light from the optical chirp generator and provide a first portion of the received light to the first input of a first waveguide coupling element.

The semiconductor photonic circuit can also include a first waveguide coupling element which can be configured to receive a first portion of the frequency chirped optical signal and split it into two optical signals of equal power to be directed to two out-of-plane of the chip optical couplers. The semiconductor photonic circuit can also include a second coupling element which can be configured to receive light or a portion of the light from the optical chirp generator and provide a second portion of the received light to the first input of a second waveguide coupling element.

The semiconductor photonic circuit can also include a second waveguide coupling element which can be configured to receive a second portion of the frequency chirped optical signal and split it into two optical signals of equal power to be directed to two waveguide detectors. The two out of plane of the chip optical couplers can also be configured to receive the optical signal reflected from the target and direct the two optical signals received to the two inputs of the first waveguide optical coupler. The first waveguide optical coupler combines the two optical signals received from the target and sends them to the first and second waveguides of the first coupling element. The signal from the second waveguide of the first coupling element is directed to the second waveguide of the second coupling element. The second coupling element combines the signal coming from the target received through the second waveguide with the local oscillator signal coming from the chirp generator through the first waveguide and mixes them on the two waveguide detectors.

As stated above, two implementations for a three-dimensional imaging and ranging system using a two-dimensional focal plane array receiver can be implemented. In one implementation, a separate transmitter illuminates the target with light and each pixel of the receiver receives a fraction of the light scattered by the target. Since matching the fields of view of the transmitter and receiver pixels for each receiver pixel is impractical, typically multiple pixels are illuminated at once. In this configuration, parts of the target that project back on the receiver in the space where electronic circuits reside are illuminated, hence reducing the receiver efficiency as transmitter light is wasted. A more efficient configuration can be obtained by a pixel architecture in which the path between the receiver and the transmitter is shared. In this configuration, at each moment we only illuminate the parts of the target which correspond to the fields of view of the light capture area of the individual receiver pixel and the overlap between the transmit and receive pixel field of view (FOV) is automatic. According to some embodiments, an additional implementation can be implemented in which the same pixel is used for both the transmit and the receive path and the two signals are separated using a mode demultiplexer, according to some example embodiments.

FIG. 1 shows a system implementation of an integrated system 100 in which the transmitter and the receivers are separate, according to some example embodiments. The outcoupler 101 emits light perpendicular on the transmitter chip and towards collimating lens 102 and then target 103. The scattered beam is gathered by the lens 104 and directed to receiver array 105. The area of the target illuminated by the transmitter beam is a fraction of the total area corresponding to the receiver array field of view. Consequently, only a subset 106 of pixels of the receiver array 105 are illuminated.

Figure 2:
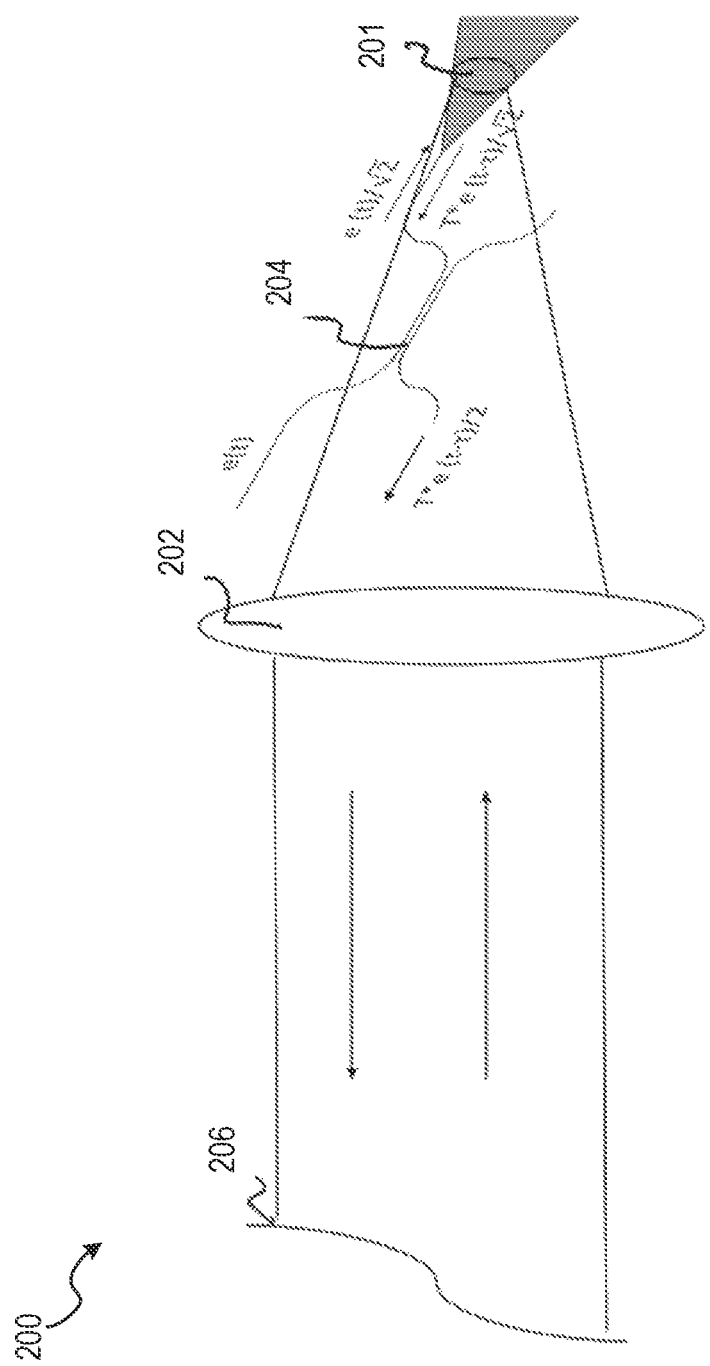
FIG. 2 illustrates a ranging configuration with an identical instantaneous field of view for the transmitter and receiver, according to some example embodiments.

FIG. 2 shows the operation of a shared or single path transceiver pixel architecture 200, according to some example embodiments. The optical signal generated by the transmitter is coupled via coupler 204 to the outcoupler grating 201. The optical signal emanates from outcoupler grating 201 towards lens 202 which collimates the beam and sends it towards target 203. After scattering from the target 203 the scattered light is captured by lens 202 and focused back into outcoupler grating 201. As the same outcoupler grating 201 is used for both coupling the transmitter light out of the chip as well as coupling the scattered light back into the chip, no light is used to illuminate areas of the target that are projected back on the receiver outside the outcoupler grating 201.

Figure 3:
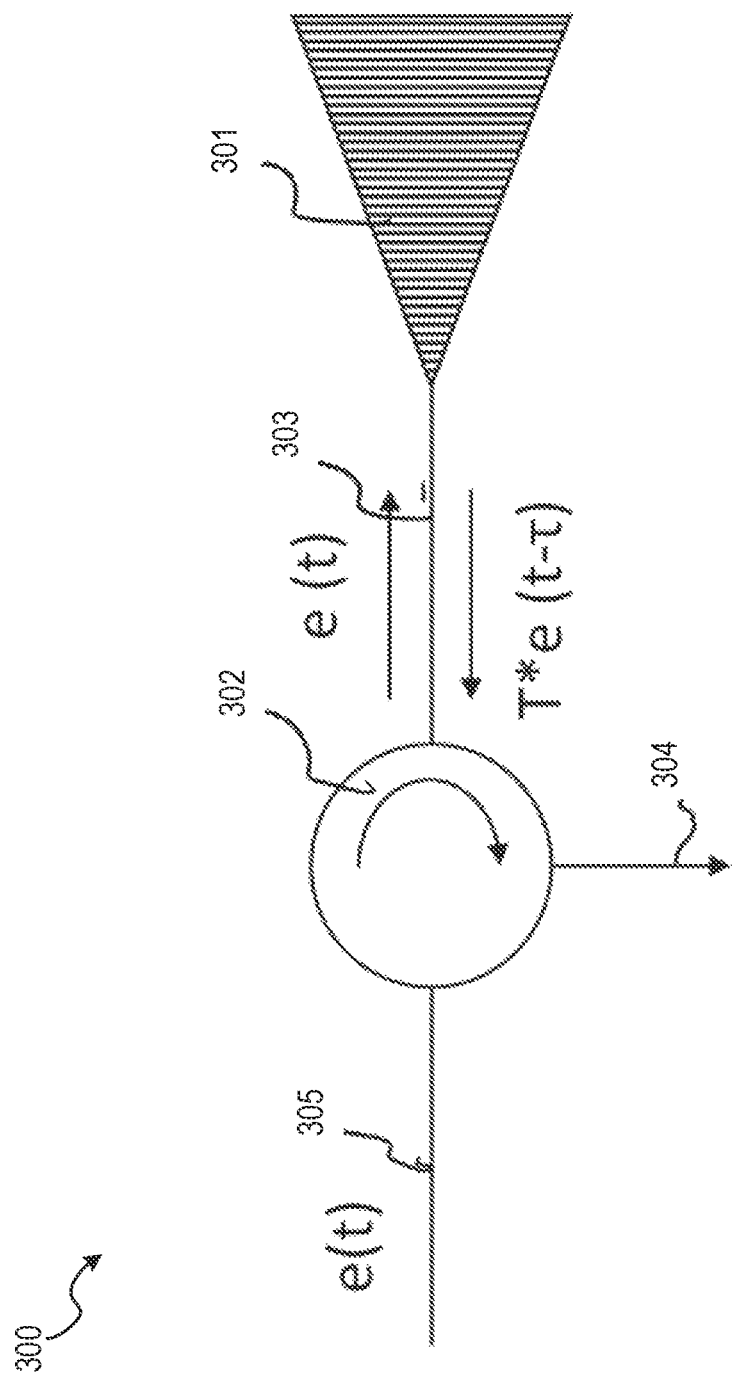
FIG. 3 illustrates a single path ranging system using a circulator to separate the outbound transmit and inbound receive signals, according to some example embodiments.

FIG. 3 shows a single path ranging system 300 using an optical circulator with a shared path port configured to guide light to be transmitted to an object and reflected by the object, according to some example embodiments. In one embodiment, the chirped optical signal generated by the transmitter is directed through waveguide 305 to the input port of an optical circulator 302 which directs the optical signal to the second port and waveguide 303 (e.g., a shared path port for the circulator optical router) of the optical circulator and couples it out of the chip through the outcoupler grating 301. The return signal scattered by the target is coupled back into the semiconductor chip through the same outcoupler grating 301, directed by waveguide 303 to the second port of the optical circulator 302 and further to the waveguide 304 at the third port of the optical circulator 302. Subsequently the return signal may be processed by a detector.

Figure 4:
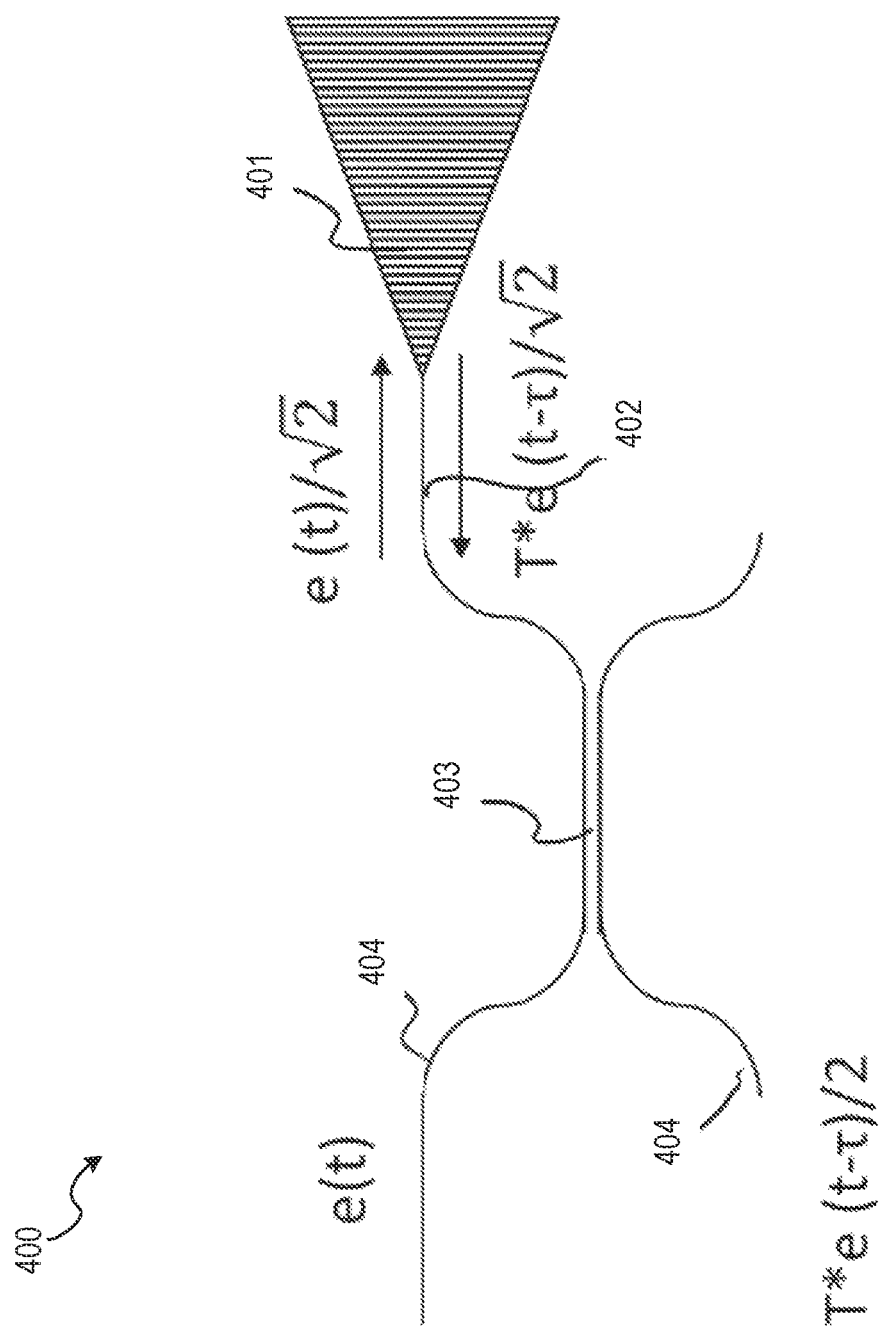
FIG. 4 illustrates a single path ranging system using a coupler to separate the outbound transmit and inbound receive signals, according to some example embodiments.

In some example embodiments, a 2×2 coupler may be used to separate the outbound and inbound signals as illustrated in the single grating shared path system 400 of FIG. 4. The chirped optical signal generated by the transmitter is directed through waveguide 404 to the first input into 2×2 coupler 403. A fraction of the light is coupled from the 2×2 coupler 403 to waveguide 402 and further directed out of the chip via the outcoupler grating 401. In one embodiment, the fraction of the light coupled by the 2×2 coupler 403 into waveguide 402 is 50%. The scattered return optical signal is coupled back into the chip through the outcoupler grating 401, directed to waveguide 402 to the input of the 2×2 coupler 403. A fraction of the light coupled into waveguide 402 is coupled out of 2×2 coupler 403 into waveguide 405 and directed to a detector. In one embodiment, the fraction of light coupled into waveguide 405 by the 2×2 coupler 403 is 50% of the light in waveguide 402.

More specifically, if we define the electric field of the chirped optical signal directed through waveguide 404 as e(t), then the electric field eO(t) of the light directed out of the chip by the outcoupler grating 401 is $$eO(t) = \frac{e(t)}{\sqrt{2}}$$

The scattered return signal eR(t) coupled back into the chip through the outcoupler grating 401 is then $$eR(t) = T\frac{e(t-\tau)}{\sqrt{2}}$$

where T is the transmission coefficient and r is the time delay between the transmitted and received signals. The transmission coefficient T depends on a variety of factors, including but not limited to the reflectivity of the target, distance to the target, efficiency of the outcoupler grating 401. The time delay z is governed by the distance between the outcoupler grating 401 and the target. The electric field eS(t) of the light directed to the detector through waveguide 405 is therefore $$eS(t) = \frac{eR(t)}{\sqrt{2}} = T\frac{e(t-\tau)}{2}$$

Finally, the signal power Ps(t) of the light directed to the detector is $$Ps(t) = \frac{A|eS(t)|^2}{Z} = \frac{A}{4Z}|T|^2|e(t-\tau)|^2$$

where A and Z are respectively the effective area and characteristic impedance of waveguide 405.

Figure 5:
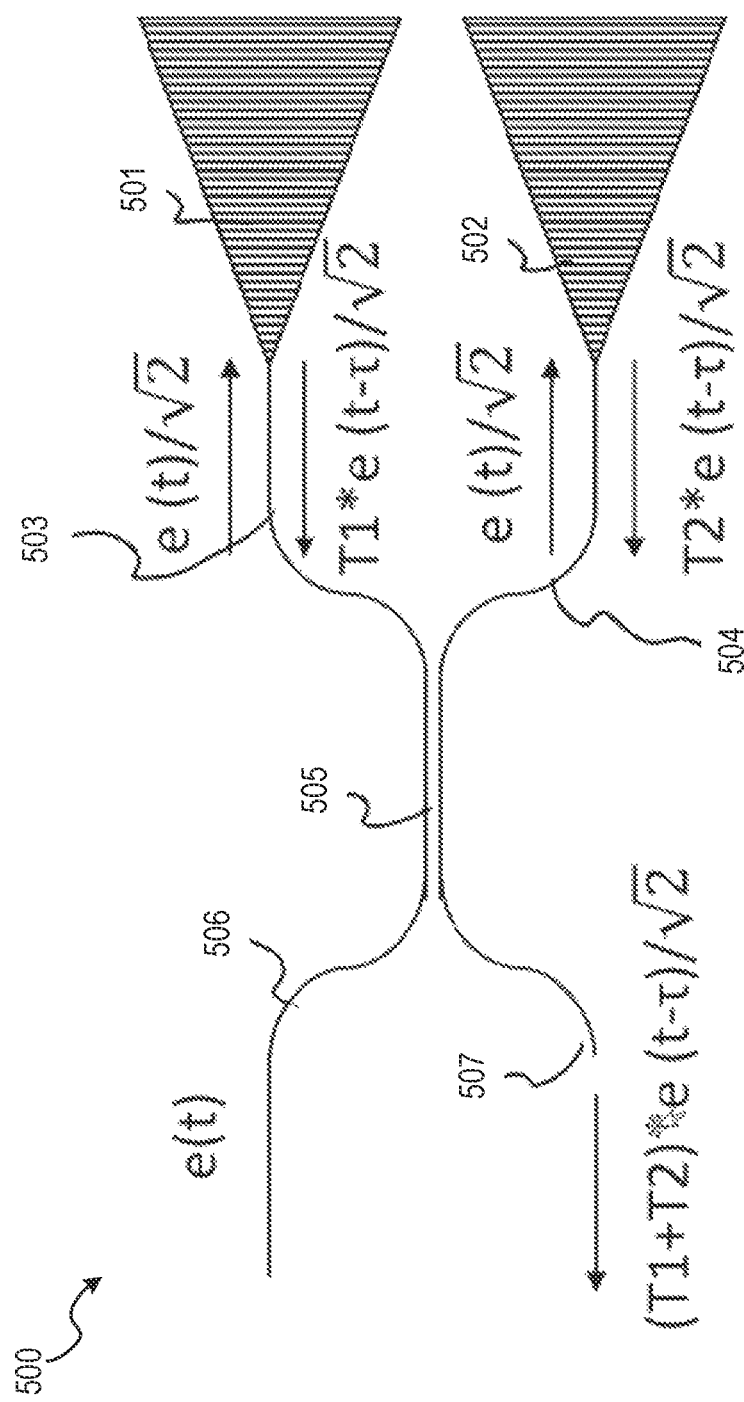
FIG. 5 illustrates a single path ranging system using a coupler with two gratings, according to some example embodiments.

In some example embodiments, two outcouplers and a 2×2 coupler are used to create an optical mode multiplexer/demultiplexer and improve the efficiency of the system as illustrated by the double outcoupler grating system 500 of FIG. 5. The chirped optical signal is a transmit beam generated by the light emitter (e.g., transmitter) that is directed through waveguide 506 to the input of the 2×2 coupler 505 (e.g., to the emitter port of 2×2 coupler 505). The chirped optical signal is divided into two fractions with one fraction directed through waveguide 503 (a shared path port) to the outcoupler grating 501 and the other fraction directed through waveguide 504 (additional shared path port) to the outcoupler grating 502. In one embodiment the fraction of optical signal coupled into waveguide 503 is 50% and the fraction of the signal coupled into waveguide 504 is 50%. The chirped optical signals coupled out of the chip through outcoupler grating 501 and outcoupler grating 502 are collimated by a lens and directed towards a target.

The return signal from the target is focused by a lens and a fraction is coupled back into the chip through outcoupler grating 501 and outcoupler grating 502. The fraction of the chirped optical signal coupled back into the chip through outcoupler grating 501 and outcoupler grating 502 is directed through waveguides 503 and 504 to the inputs of 2×2 coupler 505. A fraction of each of the return chirped optical signals coupled into 2×2 coupler 505 through waveguides 503 and 504 are directed to waveguide 507 (e.g., detector port) which directs the return chirped optical signal to a light detector (e.g., a photodetector). In one embodiment, the 2×2 coupler 505 splitting ratio is 50/50 and consequently the magnitude of the return signal collected in waveguide 507 of the double outcoupler grating system 500 is twice as large as the return signal collected in waveguide 405 of the single grating shared path system 400 (FIG. 4).

More specifically, if we define the electric field of the chirped optical signal directed through waveguide 506 as e(t), then the electric field eO(t) of the light directed out of the chip by outcoupler grating 501 and outcoupler grating 502 is $$eO(t) = \frac{e(t)}{\sqrt{2}}.$$

The scattered return signal eR1(t) coupled back into the chip through outcoupler grating 501 is then $$eR1(t) = T1\frac{e(t-\tau)}{\sqrt{2}},$$

where τ is again the time delay between the transmitted and received signals, and T1 is the transmission coefficient for light that is directed out of outcoupler grating 501, scatters off the target, and couples back into the chip through outcoupler grating 501. Similarly, the scattered return signal eR2(t) coupled back into the chip through outcoupler grating 502 is $$eR2(t) = T2\frac{e(t-\tau)}{\sqrt{2}},$$

where T2 is the transmission coefficient for light that is directed out of outcoupler grating 502, scatters off the target, and couples back into the chip through outcoupler grating 502. The electric field eS(t) of the light directed to the detector through waveguide 507 is therefore $$eS(t) = \frac{eR1(t) - eR2(t)}{\sqrt{2}} = (T1+T2)\frac{e(t-\tau)}{2}$$

Finally, the signal power Ps(t) of the light directed to the detector is $$Ps(t) = \frac{A|eS(t)|^2}{Z} = \frac{A}{4Z}|T1+T2|^2|e(t-\tau)|^2$$

The key figure of merit is the expected signal power ⟨Ps(t)⟩ over the ensemble of all possible scattering targets, which is given by $$\langle Ps(t)\rangle = \frac{A}{4Z}\langle |T1+T2|^2\rangle|e(t-\tau)|^2$$

Since the transmission coefficients T1 and T2 are uncorrelated random variables that depend upon the target reflectivity and surface profile, one finds that $$\langle |T1+T2|^2\rangle = \langle |T1|^2\rangle + \langle |T2|^2\rangle = 2|T|^2$$

where $|T|^2$ is defined as the expected value of the absolute value squared of the transmission coefficient. The expected return signal power ⟨Ps(t)⟩ collected in waveguide 507 is then $$\langle (Ps(t)\rangle = \frac{A}{2Z}|T|^2|e(t-\tau)|^2$$

which is twice the expected return signal power collected in waveguide 405 of the single grating shared path system 400 (FIG. 4).

Figure 6:
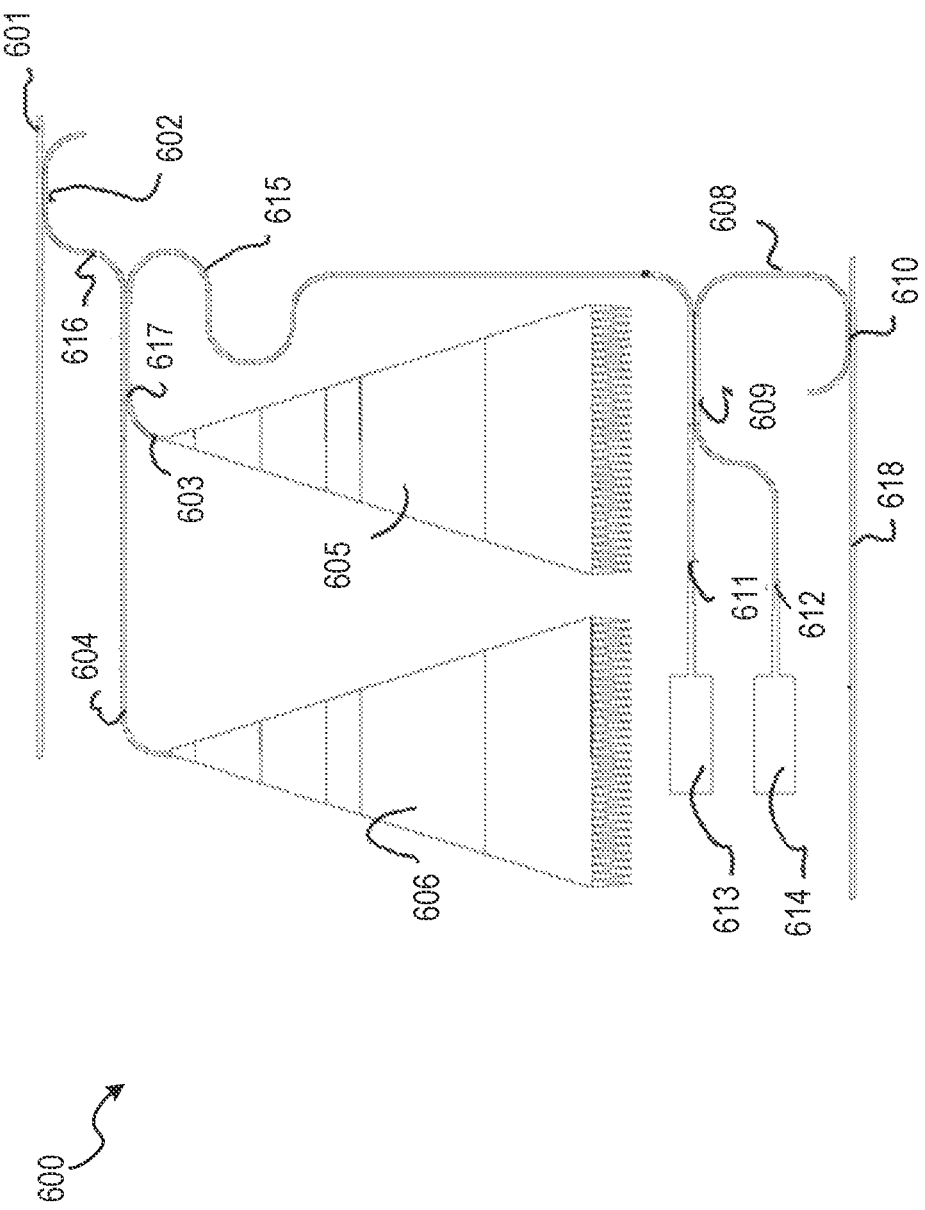
FIG. 6 illustrates a single image element (e.g., a pixel, a line of sight) integrated ranging system using an optical mode multiplexer for transmit/receive signal separation and a balanced coherent detection scheme for detection, according to some example embodiments.

In one embodiment, a single pixel using a common transmit and receive path and a balanced coherent detector is illustrated in the system 600 of FIG. 6. A first chirped frequency optical signal generated by the transmitter module is coupled into waveguide 601. A fraction of the first chirped frequency optical signal in waveguide 601 is coupled into waveguide 616 through 2×2 coupler 602. Subsequently a fraction of the first optical signal coupled in waveguide 616 is coupled through coupler 617 into waveguide 604 and a fraction of the signal coupled in waveguide 616 is coupled through coupler 617 into waveguide 603. In one example embodiment, the fraction of coupling is 50% in each coupler path.

The first optical signals in waveguides 603 and 604 are simultaneously coupled out of the plane of the chip by outcouplers 605 and 606 and directed towards a collimating lens and further towards a target. The first optical signal scattered by the target is focused by a lens into outcouplers 605 and 606 and coupled back into the plane of the chip and directed to waveguides 604 and 603. A fraction of the return first optical signal coupled in each of the waveguides 604 and 603 are coupled with the help of coupler 617 into waveguide 615.

In some example embodiments, the fraction coupled into waveguide 615 is 50% of the return first optical signal in waveguide 604 and respectively 603. A fraction of the return first optical signal in waveguide 615 is coupled into waveguide 611 and 612 respectively with the help of coupler 609 via waveguide 615. In one embodiment a local oscillator second optical signal is provided through waveguide 618. A fraction of the local oscillator second optical signal in waveguide 618 is coupled with the help of 2×2 coupler 610 into waveguide 608. In one embodiment, a fraction of the local oscillator second optical signal coupled into waveguide 608 is coupled into waveguides 611 and 612 respectively with the help of coupler 609. In one embodiment the fraction of the local oscillator second optical signal coupled into waveguides 611 and 612 respectively is 50%. The fractions of the return first optical signals and the fractions of the local oscillator second optical signals are sent through waveguides 611 and 612 towards waveguide detectors 613 and 614 respectively. As the first chirped frequency optical signal and the second local oscillator chirped frequency optical signals have different frequencies, they will generate a beat note with the frequency equal to the difference between the frequencies of the return first optical signal and the local oscillator second optical signal.

More specifically, electric fields for the optical field incident on the two detectors are described by:

$$E1 = \frac{Es + ELO}{\sqrt{2}}$$

$$E2 = \frac{Es - ELO}{\sqrt{2}}$$

where Es and ELO are the return optical signal and local oscillator electric field and E1 and E2 are the electric fields on the two detectors.

The photocurrents on the two photodetectors are given by:

$$I1(t) = \frac{R}{2} * [Ps(t) + PLO(t) + 2 * \sqrt{Ps(t)*PLO} * \cos(\omega IF * t + \theta sig(t) - \theta LO(t))]$$

$$I2(t) = \frac{R}{2} * [Ps(t) + PLO(t) - 2 * \sqrt{Ps(t)*PLO} * \cos(\omega IF * t + \theta sig(t) - \theta LO(t))]$$

The photocurrent resulting after subtracting the photocurrents of the two detectors can be given by:

$$I(t) = I1(t) - I2(t) = 2R\sqrt{Ps(t)*PLO}*\cos(\omega IF*t+\theta sig(t)-\theta LO(t))$$

where R can be the detector responsivity, Ps(t) and PLO(t) are the return optical signal and local oscillator optical power respectively, ωIF can be the difference frequency of the optical signal, and θsig(t) and θLO(t) are the time dependent phases of the optical field. After subtracting one photodetector photocurrent from the other, the fast oscillating terms Ps(t) and PLO(t), seen by the detectors as constant (dc) components of the optical signal, cancel each other, and the result can be a signal photocurrent oscillating at the ωIF intermediate frequency and with amplitude $2R\sqrt{Ps(t)*PLO}$. In addition to the amplification effect of the higher power PLO component, the amplitude can be doubled, therefore increasing the detection sensitivity.

Figure 7:
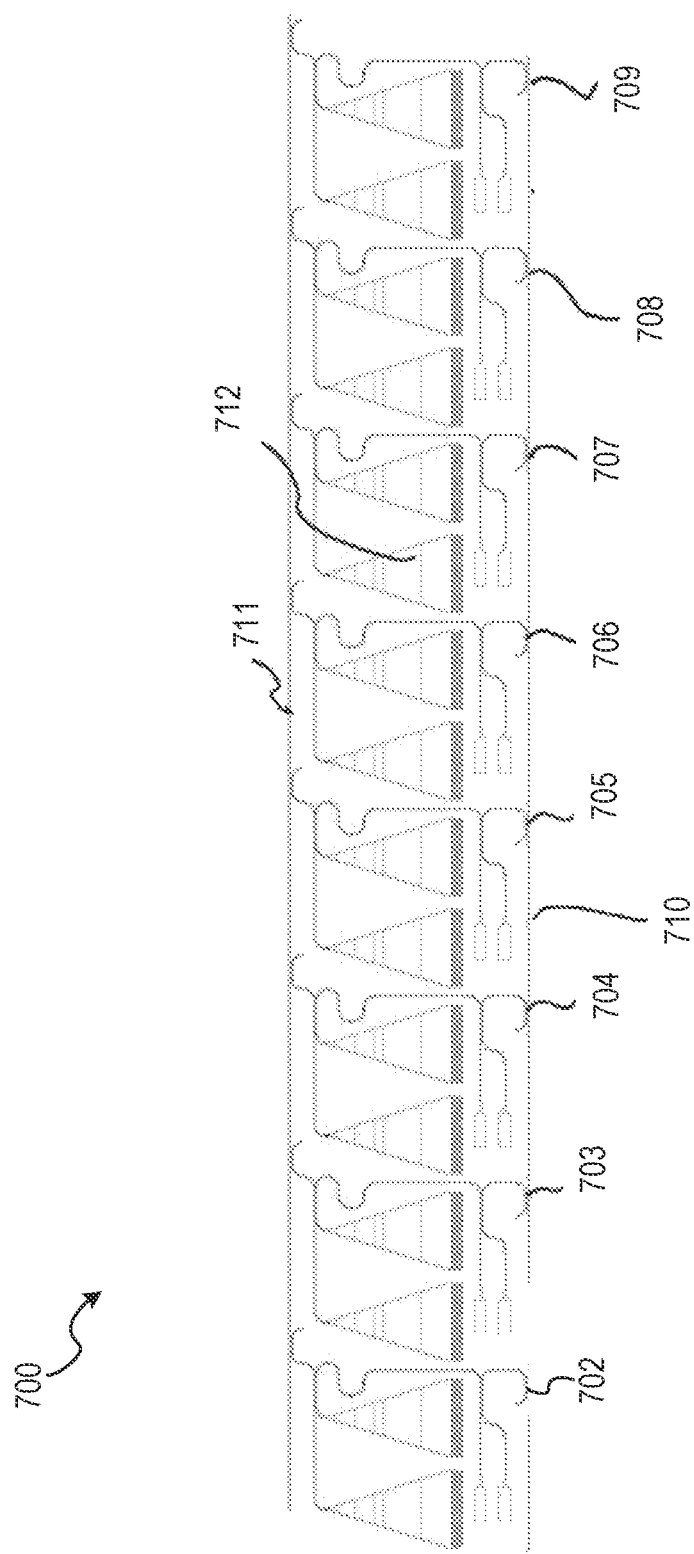
FIG. 7 illustrates a multiple image element one-dimensional implementation of the shared path transmit/receive configuration using shared path coupler and a coherent detection scheme for each image element, according to some example embodiments.

In one embodiment, the pixel architecture illustrated in FIG. 6 may be replicated to create a row of pixels as illustrated in the system 700 of FIG. 7. In one embodiment, the first chirped frequency optical signal is guided through waveguide 711 to a row of pixels 712 and second frequency chirped optical signal may be guided through waveguide 710 to a row of pixels 712. First chirped frequency optical signal is distributed to the row of pixels 712 using couplers and second chirped frequency optical signal is distributed to the ensemble of pixels 712 using couplers 702 to 709. In one embodiment each coupler along waveguide 711 has increasing coupling strength such as each pixel to receive the same amount of first optical signal and each coupler along waveguide 710 has increasing coupling strength such as each pixel to receive the same amount of local oscillator second optical signal.

Figure 8:
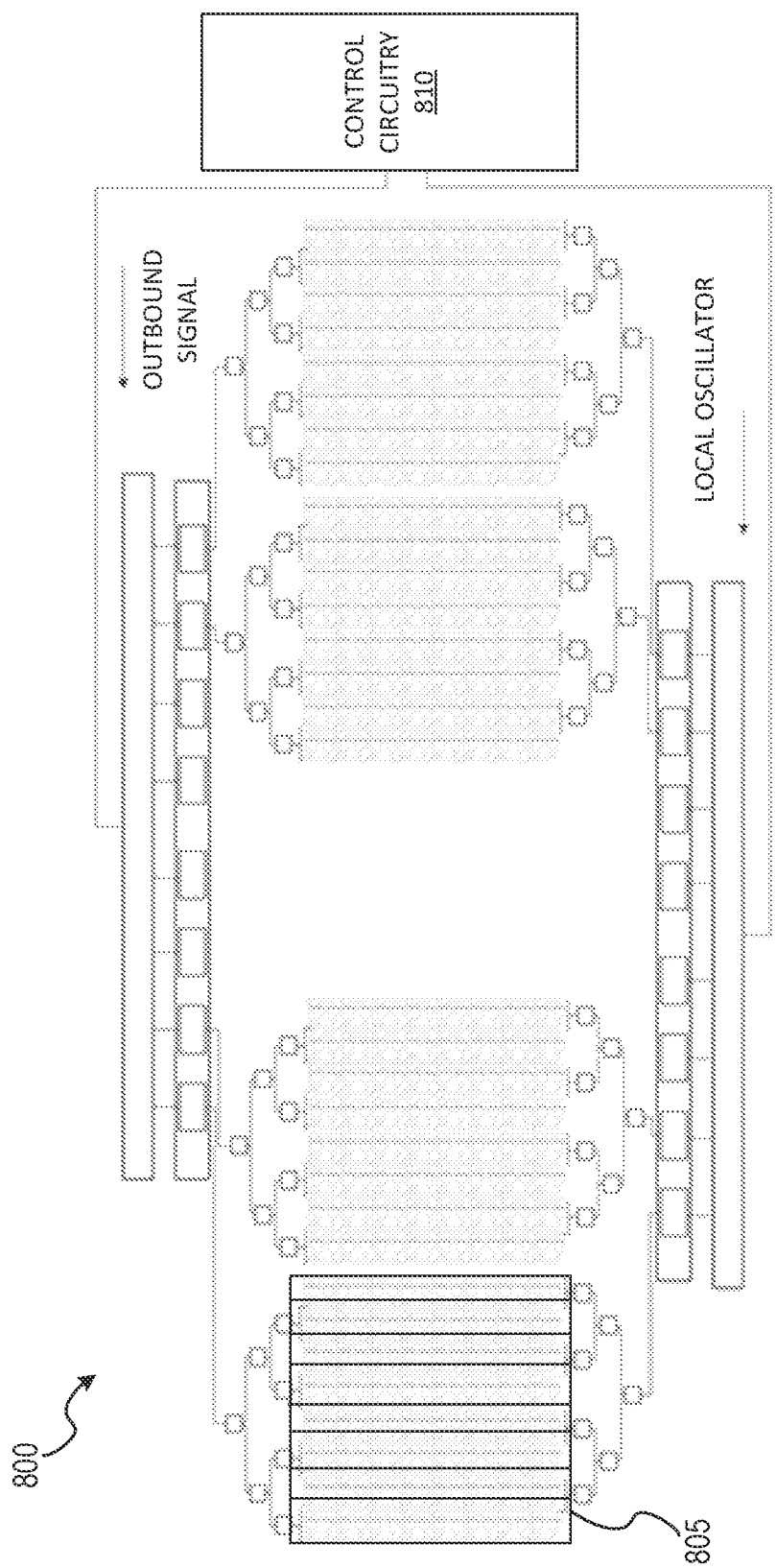
FIG. 8 illustrates a multiple image element two-dimensional implementation of the shared path transmit/receive configuration using a shared path coupler and a coherent detection scheme for each image element, according to some example embodiments.

FIG. 8 illustrates a multiple image element two-dimensional implementation of the shared path transmit and receive system 800 using an optical mode multiplexer and coherent detection scheme in each image element, according to some example embodiments. The shared path transmit and receive system 800 comprises four two-dimensional arrays, such as 2D array 805. Each column within the 2D array corresponds to a row of pixels 712 of FIG. 7. It is appreciated that any number of arrays or rows in the array can likewise be implemented, according to some example embodiments. In some example embodiments, the control circuitry 810 includes a light emitter controls to generate the emitter light, receive the reflected light, and generate ranging values (e.g. distance values) using continuous wave differences in frequency of phases between the transmitted and received light.

Figure 9:
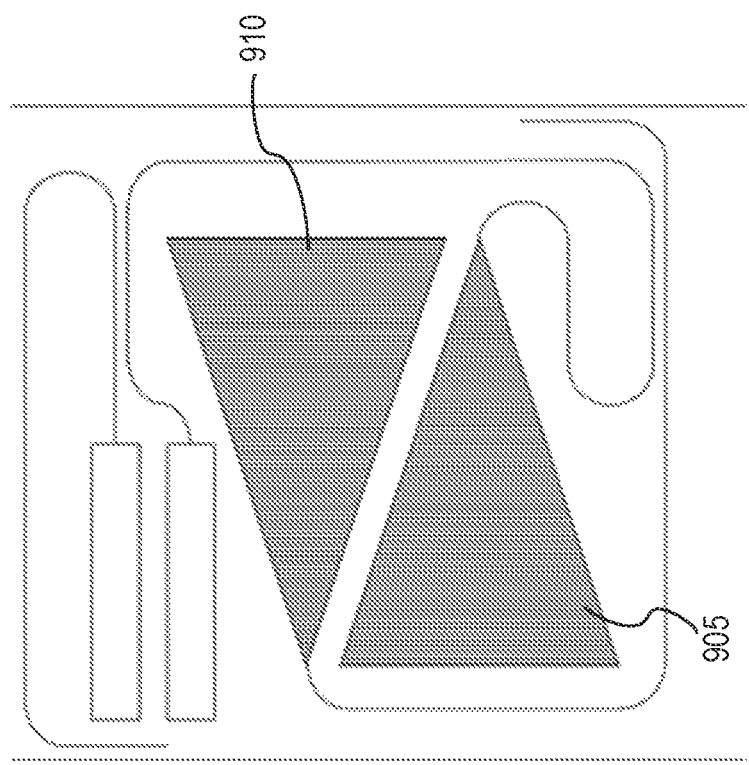
FIG. 9 illustrates a compact implementation of an image element ranging system, according to some example embodiments.

FIG. 9 illustrates a compact implementation of an image element ranging system 900 using an optical mode multiplexer for transmit/receive signals separation and a balanced coherent detection scheme for detection, according to some example embodiments. In the example of FIG. 9, the footprint of the pixel image element is reduced by arranging the port of outcoupler 905 to the wide end of outcoupler 910 and vice versa, according to some example embodiments.

Figure 10:
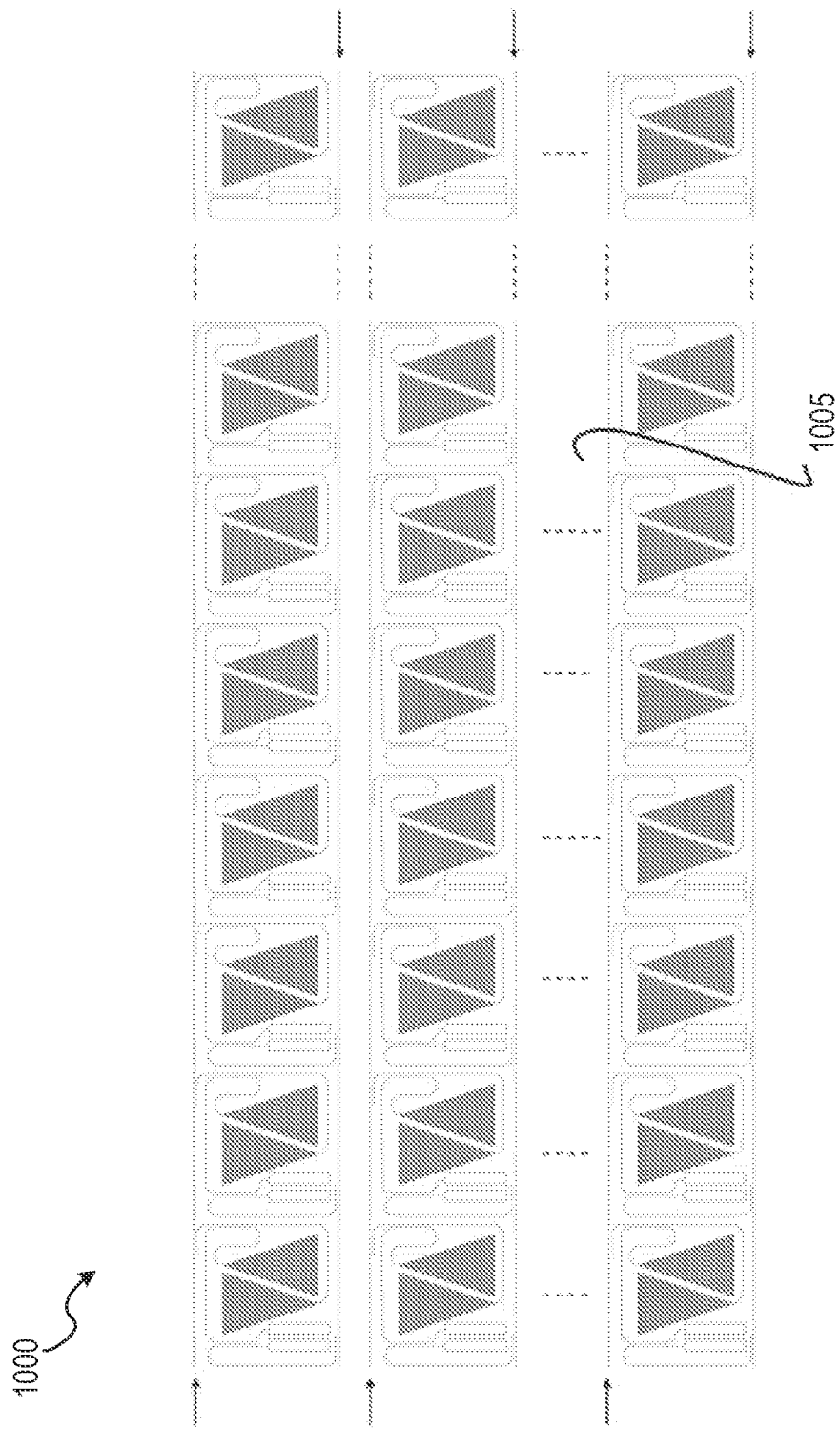
FIG. 10 illustrates a compact multiple image element two-dimensional implementation of a shared path coupler configuration, according to some example embodiments.

FIG. 10 illustrates a compact multiple image element two-dimensional architecture 1000 of a shared path transmit/receive configuration using an optical mode multiplexer and coherent detection scheme in each image element, according to some example embodiments. In the example of FIG. 10, each row 1005 comprises a plurality of compact pixels having compact outcouplers arranged as discussed in FIG. 9.

Figure 11B:
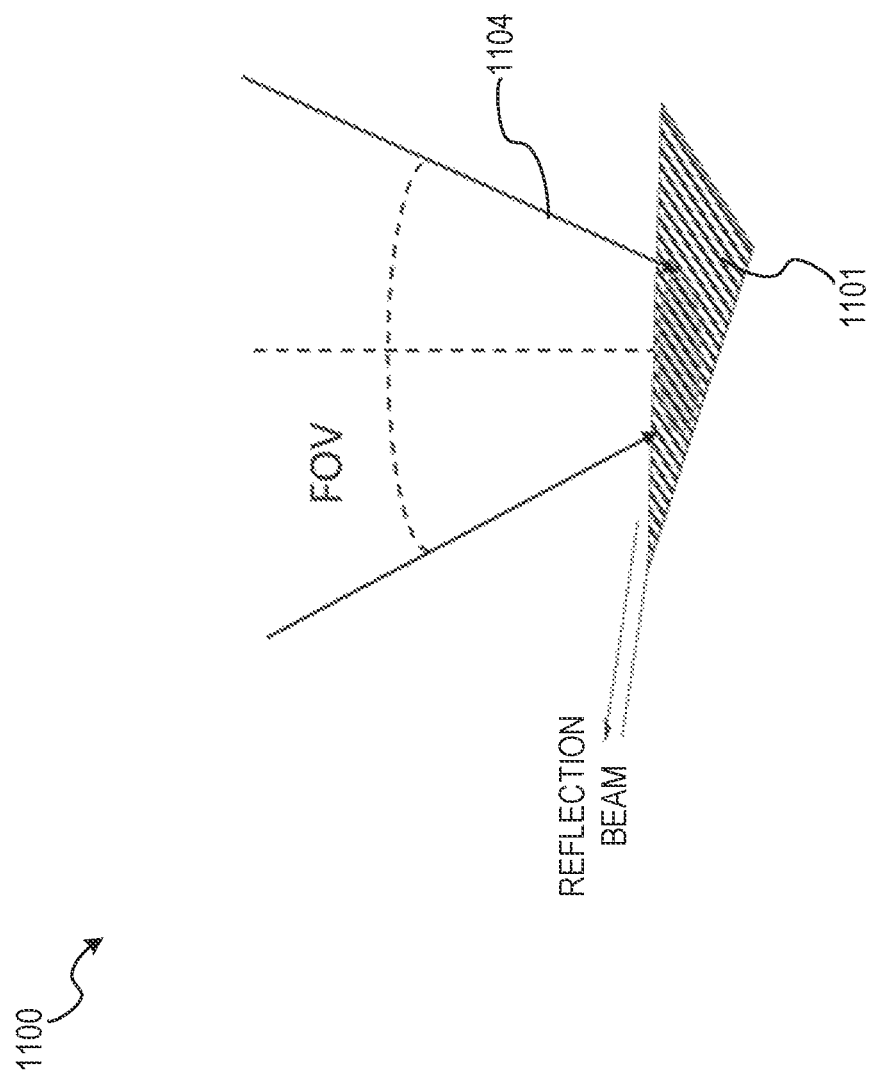

FIGS. 11A and 11B illustrate a symmetric normal emitting grating with a wide field of view for transmitting and receiving, according to some example embodiments. In FIG. 2, the reflected beam directed to outcoupler grating 201 can be incident to the outcoupler at any angle, depending on the choice of grating of the outcoupler grating 201. FIGS. 11A and 11B show an example embodiment of the single path system 1100 in normal emission mode, according to some example embodiments. In FIG. 11A, a transmitter generates a transmission beam which is coupled to outcoupler 1101 and emanates from outcoupler as beam 1102 that is normal (orthogonal) to the surface of outcoupler 1101. In FIG. 11B, the transmission beam has reflected or scattered off an object and is received as scatter beam 1104 which is normal to the outcoupler 1101. The scatter beam is received by the outcoupler 1101 and output as a reflection beam to a detector (e.g., photodiode).

Figure 12A:
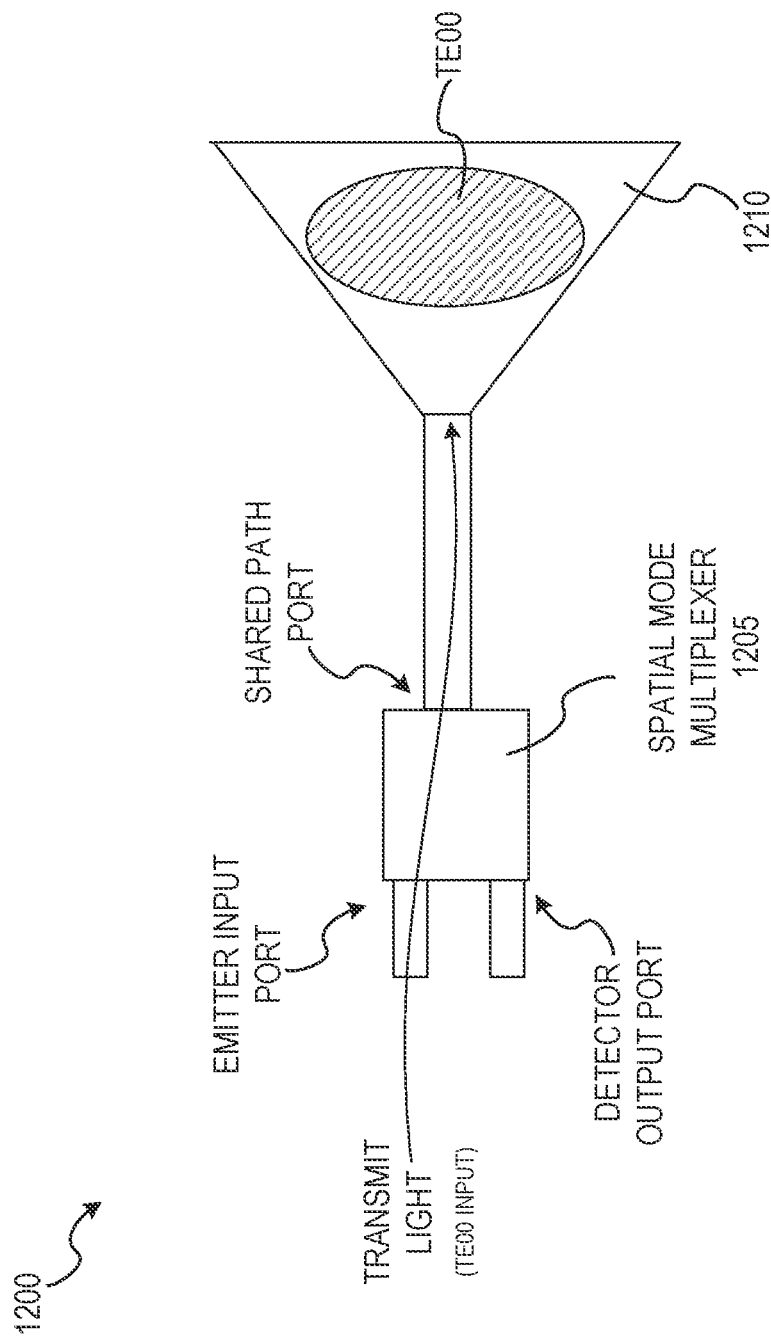
FIGS. 12A and 12B show an example ranging system using a mode-based multiplexer, according to some example embodiments.
Figure 12B:
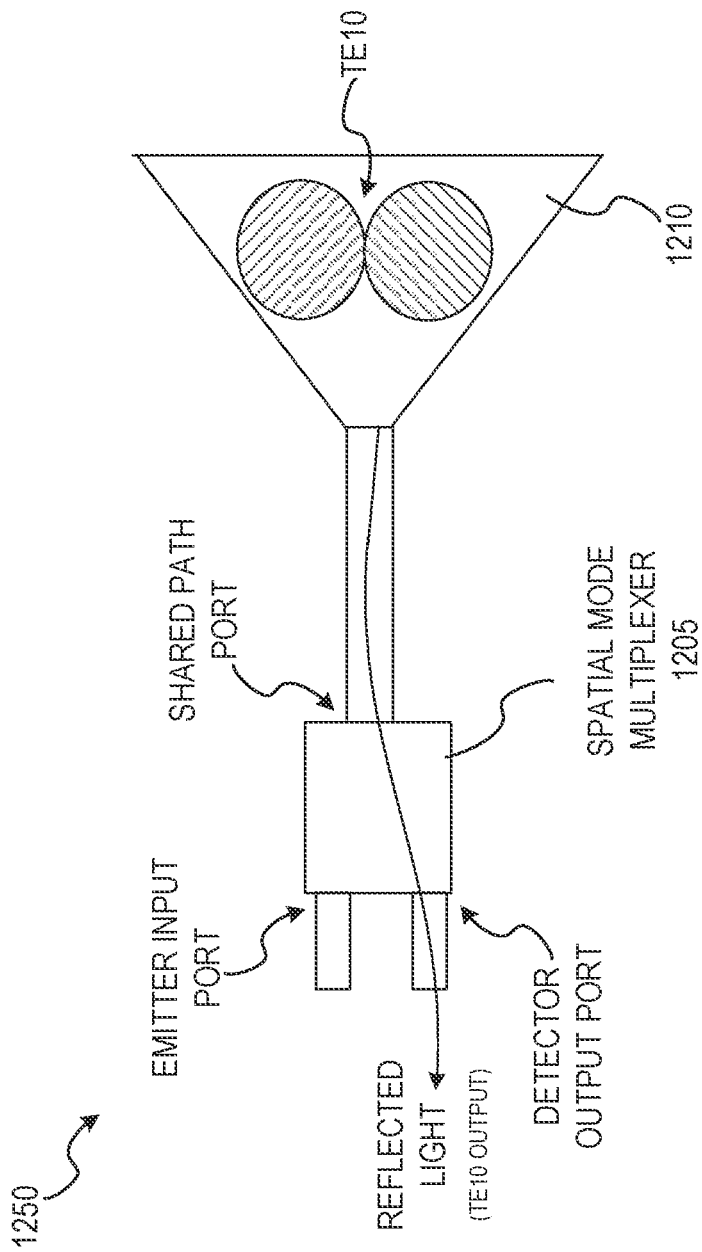

FIGS. 12A and 12B illustrate single path ranging systems that couples light to the grating based on different transverse modes, according to some example embodiments. To reduce wasted light (e.g., light exiting a non-used port of a 2×2 coupler), a spatial mode multiplexer 1205 (SMM) is configured to transmit light in one spatial mode and receive light in another mode. As illustrated in transmission arrangement 1200 in FIG. 12A, this can be achieved by placing a waveguide mode multiplexer such as SMM 1205 before the outcoupler grating 1210. Light in a first mode (Transverse Electric Mode$_{00}$, "TE00") is input into an upper port of the SMM 1205 and emanates from outcoupler grating 1210 as denoted by the "TE00" area (denoted by a circular area with left-diagonal shading), as displayed in outcoupler grating 1210.

Turning to the receiving arrangement 1250 in FIG. 12B, reflected light in a second mode (Transverse Electric Mode$_{10}$, "TE10") is received by outcoupler grating 1210, as denoted by the "TE10" (denoted by circular areas, with left-diagonal and right-diagonal shading. The received TE10 light is then routed to the lower port via SMM 1205 to a detector (e.g., photodiode).

Figure 13:
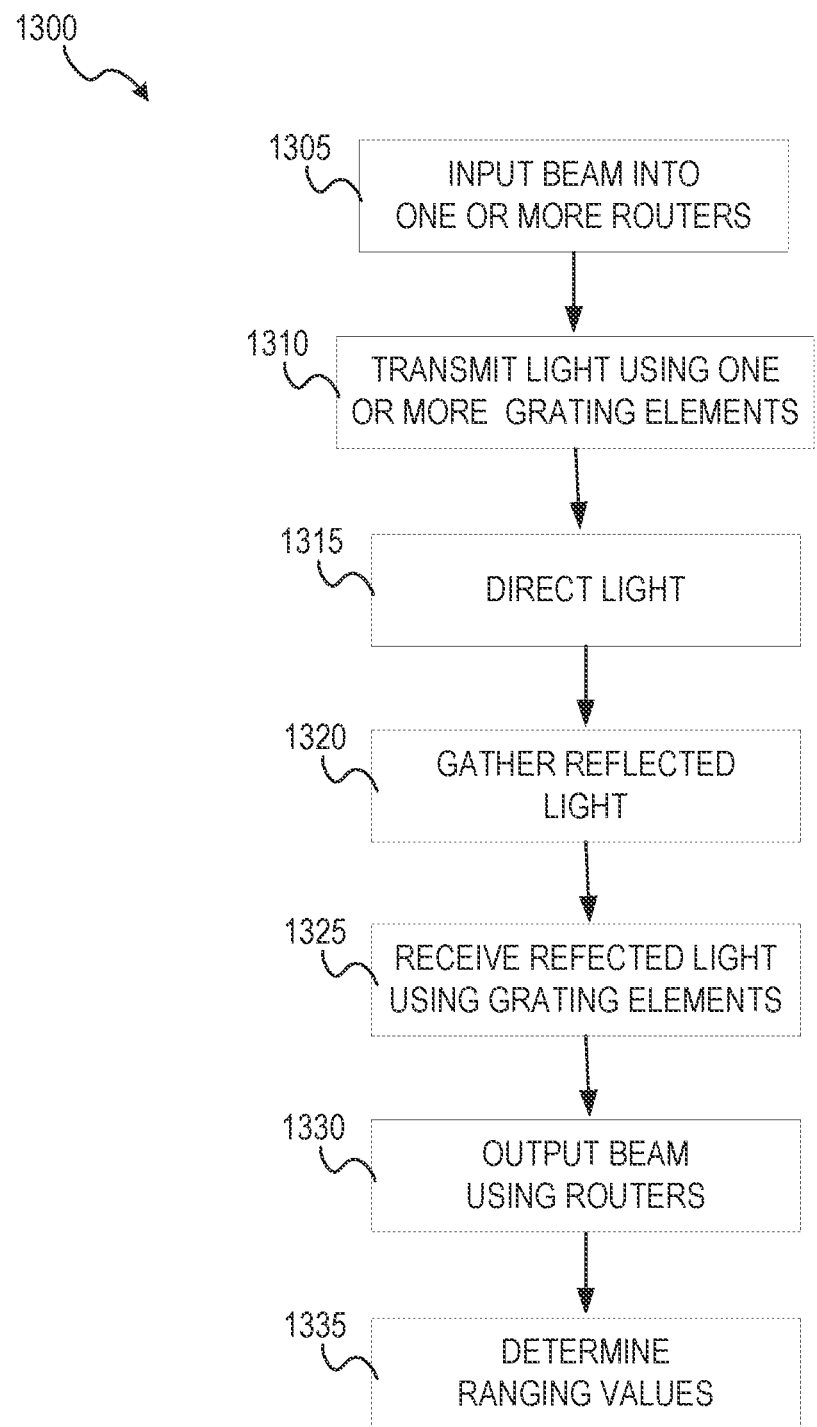
FIG. 13 shows a flow diagram for a method of ranging using a shared path ranging system, according to some example embodiments.

FIG. 13 shows a flow diagram of an example method 1300 for ranging using a shared path ranging system, according to some example embodiments. The method 1300 can be implemented in different ways in accordance with the different example embodiments discussed above (e.g., a single grating that transmits and receives, an array of gratings to transmit and receive, with routers connected to gratings in various configurations). Continuing, at operation 1305, a beam of light is input into one or more routers (e.g., into a 2×2 coupler, an optical circulator, a mode-based multiplexer such as an SMM), such as a single router or an array of routers. At operation 1310, the one or more routers transmit the light using coupled grating elements that transmit the beam into free space.

At operation 1315, the light from the one or more gratings is directed. For example, specific gratings can be selected to transmit the light which is collimated through a lens at different angles to steer the light. In some example embodiments, the gratings emit into free space without the lens, where the light is reflected off the target and directly back into the gratings.

At operation 1320, the reflected light is gathered. For example, the light reflected by the physical object is gathered by a lens that transmitted the light, which then directs the reflected light back to the array of gratings. In some example embodiments implemented without the help of a collimating lens, operation 1320 may be omitted from method 1300. At operation 1325, one or more gratings receive the reflected light, e.g., from the lens or directly from the physical object. At operation 1330, the router outputs the reflection beam towards a detector, such as a photodiode. For example, the router may be an optical circulator that directs the light towards an output port, or may be another port of a 2×2 coupler, or receive port of a two-port SMM, where the detectors are coupled to the receive or output ports of the routers. At operation 1335, the received reflected light is compared to the transmitted light to determine one or more ranging values, such as the distance or velocity of the physical target object. For example, the distance values can be generated using time of flight data (e.g., as in ToF Lidar), or distance and velocity values can be generated using frequency shift differences (e.g., Frequency Modulation Continuous Wave Lidar), or phase shift differences (e.g., Amplitude Modulation Continuous Wave Lidar) where the same pixels are implemented to transmit and receive the light. Further details of pixel arrays for ranging in accordance with some example embodiments is discussed in U.S. patent application Ser. No. 16/489,915, filed on Aug. 29, 2019, which is incorporated by reference herein in its entirety.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Accordingly, the specification is intended to embrace all such modifications and variations of the disclosed embodiments that fall within the spirit and scope of the appended claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g., elements that are conjunctively present in some cases and disjunctively present in other cases. Multiple elements listed with "and/or" should be construed in the same fashion, e.g., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (e.g., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. In the claims, as well as in the specification above, all transitional phrases such as "comprising," "including," "carrying," "having," "containing," "involving," "holding," "composed of," and the like are to be understood to be open-ended, e.g., to mean including but not limited to.

What is claimed is:

1. A LIDAR sensor system comprising:
a laser source that is configured to generate a frequency modulated laser signal; and
a transceiver comprising:
a source input configured to receive the frequency modulated laser signal;
a coherent pixel array that includes a plurality of coherent pixels; and
first and second waveguides, the first waveguide being configured to couple a portion of the frequency modulated laser signal to at least one coherent pixel of the coherent pixel array as a transmit signal, and the second waveguide being configured to couple a local oscillator signal to the at least one coherent pixel, the at least one coherent pixel being configured to emit the transmit signal and receive a reflection of the transmit signal as a reflected signal, and configured to output a return signal that is a portion of the reflected signal.

2. The LIDAR sensor system of claim 1, wherein the transmit signal is split from the frequency modulated laser signal.

3. The LIDAR sensor system of claim 1, wherein the local oscillator signal is split from the frequency modulated laser signal.

4. The LIDAR sensor system of claim 1, wherein the at least one coherent pixel of the coherent pixel array comprises a bi-directional coupler configured to emit the transmit signal and receive the reflection of the transmit signal.

5. The LIDAR sensor system of claim 4, wherein the bi-directional coupler comprises a bi-directional grating.

6. The LIDAR sensor system of claim 1, wherein the at least one coherent pixel of the coherent pixel array comprises a mixer coupled to receive the return signal and the local oscillator signal and to mix the return signal and the local oscillator signal to generate one or more output signals.

7. The LIDAR sensor system of claim 6, further comprising one or more processors configured to determine depth information for a field of view of the transceiver based on the one or more output signals.

8. The LIDAR sensor system of claim 6, wherein the at least one coherent pixel of the coherent pixel array further comprises at least one photodiode coupled to the mixer to provide the one or more output signals as electrical signals.

9. The LIDAR sensor system of claim 1, wherein the plurality of coherent pixels is arranged in a linear array or a two-dimensional array.

10. A frequency modulated continuous wave (FMCW) LIDAR system comprising:
a LIDAR chip including a FMCW LIDAR transceiver implemented on a photonic integrated circuit, the photonic integrated circuit comprising:
a source input configured to receive a frequency modulated laser signal;
a coherent pixel array that includes a plurality of coherent pixels; and
first and second waveguides, the first waveguide being configured to couple a portion of the frequency modulated laser signal to at least one coherent pixel of the coherent pixel array as a transmit signal, and the second waveguide being configured to couple a local oscillator signal to the at least one coherent pixel, the at least one coherent pixel being configured to emit the transmit signal and receive a reflection of the transmit signal as a reflected signal, and configured to output a return signal that is a portion of the reflected signal; and
a lens system positioned to collimate the transmit signal emitted through the at least one coherent pixel, wherein the lens system is also positioned to receive the reflected signal and couple the reflected signal to the at least one coherent pixel.

11. The FMCW LIDAR system of claim 10, wherein the transmit signal is split from the frequency modulated laser signal.

12. The FMCW LIDAR system of claim 10, wherein the local oscillator signal is split from the frequency modulated laser signal.

13. The FMCW LIDAR system of claim 10, wherein the at least one coherent pixel of the coherent pixel array comprises a bi-directional coupler configured to emit the transmit signal and receive the reflection of the transmit signal.

14. The FMCW LIDAR system of claim 13, wherein the bi-directional coupler comprises a bi-directional grating.

15. The FMCW LIDAR system of claim 10, wherein the at least one coherent pixel of the coherent pixel array comprises a mixer coupled to receive the return signal and the local oscillator signal and to mix the return signal and the local oscillator signal to generate one or more output signals to be used to determine depth information for a field of view of FMCW LIDAR.

16. The FMCW LIDAR system of claim 15, wherein the at least one coherent pixel of the coherent pixel array further comprises at least one photodiode coupled to the mixer to provide the one or more output signals as electrical signals.

17. The FMCW LIDAR system of claim 10, wherein the lens system is configured to:
project the transmit signal emitted from the at least one coherent pixel into a corresponding portion of a field of view of the FMCW LIDAR system; and
provide the reflection of the transmit signal to the at least one coherent pixel.

18. The FMCW LIDAR system of claim 10, wherein the plurality of coherent pixels is arranged in a linear array, and the lens system produces collimated transmitted signals that scan a transceiver field of view along one angular dimension.

19. The FMCW LIDAR system of claim 10, wherein the plurality of coherent pixels is arranged in a two-dimensional array, and the lens system produces collimated transmitted signals that scan a transceiver field of view along two angular dimensions.

20. A method of performing LIDAR, the method comprising:
generating a frequency modulated laser signal;
receiving, by a source input of a transceiver, the frequency modulated laser signal;
coupling, by a first waveguide of the transceiver, a portion of the frequency modulated laser signal to at least one coherent pixel of a coherent pixel array as a transmit signal;
coupling, by a second waveguide of the transceiver, a local oscillator signal to the at least one coherent pixel;
emitting, by the at least one coherent pixel, the transmit signal;
receiving, by the at least one coherent pixel, a reflection of the transmit signal as a reflected signal; and
outputting, by the at least one coherent pixel, a return signal that is a portion of the reflected signal.

* * * * *

UNITED STATES PATENT AND TRADEMARK OFFICE
CERTIFICATE OF CORRECTION

PATENT NO. : 11,789,124 B2
APPLICATION NO. : 18/122397
DATED : October 17, 2023
INVENTOR(S) : Alexander Yukio Piggott It is certified that error appears in the above-identified patent and that said Letters Patent is hereby corrected as shown below:

In the Drawings

On sheet 2 of 15, Fig. 2, reference numeral 206, Line 1, delete "206" and insert --203-- therefor On sheet 4 of 15, Fig. 4, reference numeral 404 (Second Occurrence), Line 1, delete "404" and insert --405-- therefor On sheet 15 of 15, Fig. 13, reference numeral 1325, Line 1, delete "REFECTED" and insert --REFLECTED-- therefor In the Specification In Column 5, Line 59, delete "mw," and insert --mW,-- therefor In Column 8, Line 29, delete "r" and insert --τ-- therefor In Column 8, Line 34, delete "z" and insert --τ-- therefor In Column 9, Lines 55-59, delete "$\frac{eR1(t) - eR2(t)}{\sqrt{2}}$" and insert --$\frac{eR1(t) + eR2(t)}{\sqrt{2}}$-- therefor In Column 10, Lines 18-22, delete "⟨(Ps(t)⟩" and insert --⟨Ps(t)⟩-- therefor In Column 11, Lines 8-11, delete "$E1 = \frac{Es + ELO}{\sqrt{2}}$" and insert Signed and Sealed this
Thirteenth Day of February, 2024

*Katherine Kelly Vidal*
Katherine Kelly Vidal
*Director of the United States Patent and Trademark Office*

CERTIFICATE OF CORRECTION (continued)
U.S. Pat. No. 11,789,124 B2

-- $$E1 = \frac{Es + ELO}{\sqrt{2}}$$ -- therefor

In Column 12, Line 50, delete "1205 (SMM)" and insert --(SMM) 1205-- therefor